(12) United States Patent
Wurster et al.

(10) Patent No.: US 12,107,464 B2
(45) Date of Patent: Oct. 1, 2024

(54) LAMINATED CORE AND METHOD FOR PRODUCING A LAMINATED CORE

(71) Applicant: Dr. Ing. h.c. F. Porsche Aktiengesellschaft, Stuttgart (DE)

(72) Inventors: Peter Wurster, Kornwestheim (DE); Tobias Schmack, Stuttgart (DE); Niklas Lamparsky, Leonberg (DE); Florian Braunbeck, Leinfelden-Echterdingen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 267 days.

(21) Appl. No.: 17/701,891

(22) Filed: Mar. 23, 2022

(65) Prior Publication Data
US 2022/0352793 A1 Nov. 3, 2022

(30) Foreign Application Priority Data
Apr. 28, 2021 (DE) .................. 10 2021 110 816.0

(51) Int. Cl.
*H02K 15/02* (2006.01)
*H02K 1/14* (2006.01)
*H02K 1/16* (2006.01)

(52) U.S. Cl.
CPC .......... *H02K 15/024* (2013.01); *H02K 1/148* (2013.01); *H02K 1/16* (2013.01)

(58) Field of Classification Search
CPC .. B23K 26/032; B23K 26/044; B23K 31/125; B23K 9/0953; B23K 9/0956; B23K 9/1274; B23K 3/08; B25J 9/1689; G05B 2219/37074; G05B 2219/45104; H02K 1/04; H02K 1/148; H02K 1/16; H02K 15/024; H02K 15/12; H02K 5/08
See application file for complete search history.

(56) References Cited

U.S. PATENT DOCUMENTS

| | | | |
|---|---|---|---|
| 2014/0115875 A1* | 5/2014 | Baba | H02K 15/12 29/596 |
| 2016/0049836 A1* | 2/2016 | Shimomura | H02K 1/276 310/156.21 |
| 2020/0007000 A1* | 1/2020 | Berendes | H02K 5/128 |
| 2020/0177064 A1* | 6/2020 | Oda | H02K 15/12 |

FOREIGN PATENT DOCUMENTS

| | | | | |
|---|---|---|---|---|
| DE | 102016004633 A1 | 9/2016 | | |
| JP | 2016086508 A | * | 5/2016 | |
| WO | WO-2012085280 A2 | * | 6/2012 | ............. H02K 15/12 |

OTHER PUBLICATIONS

WO-2012085280-A2, Krompass, all pages (Year: 2012).*
JP-2016086508-A, Hasuo, all pages (Year: 2016).*

* cited by examiner

*Primary Examiner* — Naishadh N Desai
(74) *Attorney, Agent, or Firm* — Gerald E. Hespos; Michael J Porco

(57) ABSTRACT

A laminated core (10) is provided for a stator or rotor of an electric machine. The laminated core (10) is formed from multiple laminations (12) that are stacked one on top of another in an axial direction (14) to form a lamination stack (16). A through-opening (18) is formed in the lamination stack (16) and extends parallel to the axial direction (14). A tie rod (20) of plastic is introduced, in particular injection molded, in the through-opening (18) to assemble the laminated core (10).

9 Claims, 3 Drawing Sheets

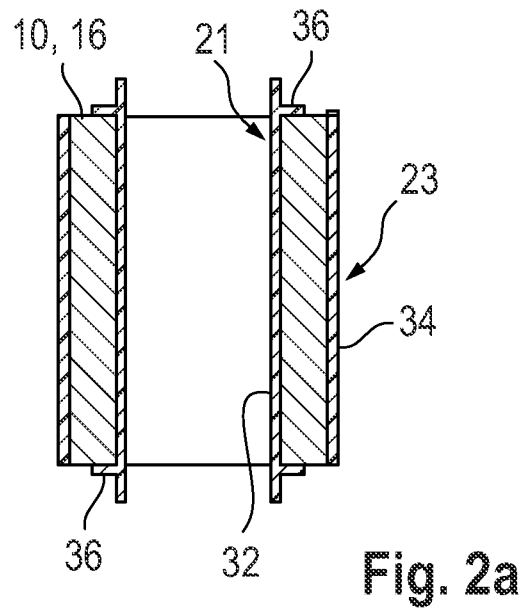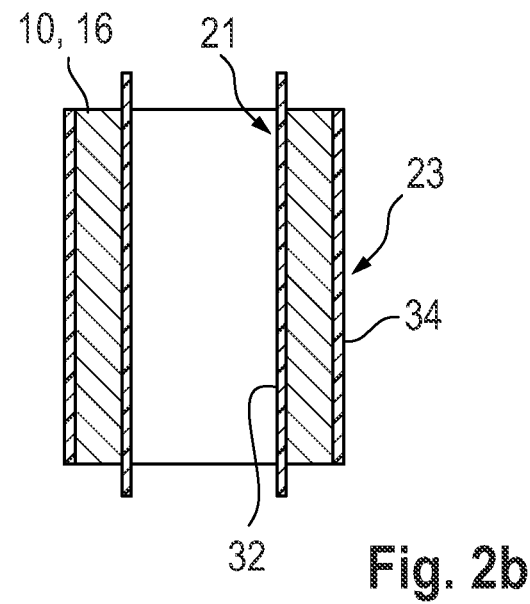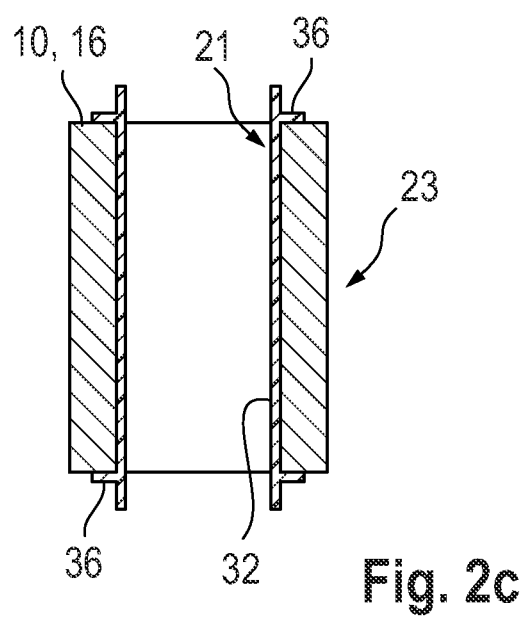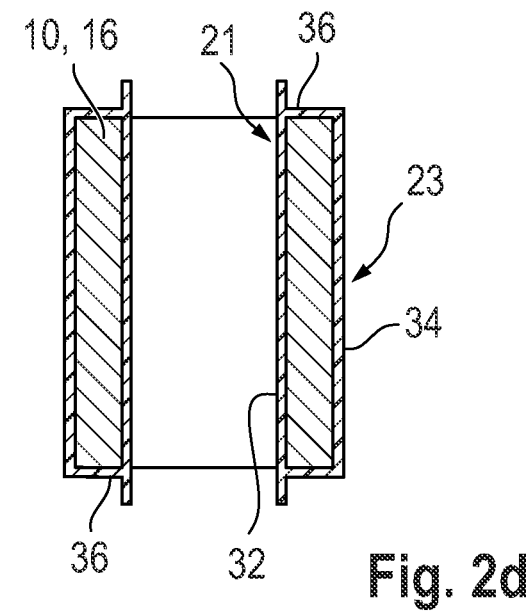

LAMINATED CORE AND METHOD FOR PRODUCING A LAMINATED CORE

CROSS REFERENCE TO RELATED APPLICATION

This application claims priority under 35 USC 119 to German Patent Appl. No. 10 2021 110 816.0 filed on Apr. 28, 2021, the entire disclosure of which is incorporated herein by reference.

BACKGROUND

Field of the Invention

The invention relates to a laminated core and to a method for producing a laminated core.

Related Art DE 10 2016 004 633 A1 discloses a method for producing a laminated core for an electric machine, in which multiple laminations are punched from an electrical steel strip by means of a punching device. The punched laminations are stacked in the device and plastic is injection molded around them. The plastics material holds the laminated core together. A corresponding amount of plastic is required o achieve a sufficiently stable attachment by virtue of encapsulation by injection molding.

An object of the invention is to provide an improved laminated core and an improved method for producing a laminated core.

SUMMARY

A laminated core is provided for a stator or rotor of an electric machine. The laminated core is formed from multiple laminations that are stacked one on top of another in an axial direction to form a lamination stack. A through-opening extends axially through the lamination stack. The laminated core is assembled by inserting a tie rod of plastic in the through-opening and then injection molding.

An introduced or injection-molded tie rod of plastic enables a stable coupling of the laminations in a structurally favorable way and with comparatively little plastics material. This contributes to a stable configuration of the laminated core. The individual laminations are put together by an assembly method to form a laminated core.

The laminations may be formed as disk-shaped (closed disk) or annular (circular ring with internal through-opening). The laminated core (stator laminated core or rotor laminated core) may have a multiplicity of individual laminations. The laminations (sheet-metal laminations) may be made from steel. The laminations may have a thickness of 0.2 to 0.5 mm (millimeters).

Annular laminations may have a multiplicity of stator teeth forming grooves (stator grooves) between the teeth and formed on the radial inner side of the laminations (at the edge of the through-opening). The radially inner free ends of the stator teeth may have a cross-sectionally widened head.

Multiple through-openings may be formed in the lamination stack and each through-opening may extend parallel to the axial direction through the laminations. Tie rods of plastic are introduced, in particular injection molded, respectively in the through-openings to assemble the laminated core. Multiple through-openings with tie rods arranged therein make it possible to achieve a more stable and uniform attachment of the laminations to one another. The through-openings may be arranged in the laminations opposite one another in each case and/or in the circumferential direction at equal angles in relation to one another. It is possible for example to provide four through-openings that are offset in relation to one another by an angle of 90°.

Opposite ends of each tie rod may be widened with respect to the through-opening. This contributes to a stable connection of the laminations. The comparatively large contact surface makes it possible to transfer correspondingly large forces.

Plastic may be injection molded around the lamination stack or the laminated core on an outer side so that encapsulation by injection molding forms an outer sheath. The outer sheath of plastic makes it possible to achieve noise optimization given an interference fit in the motor housing and leads to comparatively low acoustic emissions.

Plastic may be injection molded around the lamination stack or the laminated core on an inner side so that the encapsulation by injection molding forms an inner sheath. The inner sheath may be used for insulation. In addition, it is possible to realize sealing of the stator/rotor space.

The outer sheath and/or the inner sheath may each have a sleeve-shaped form that extends in the axial direction. The outer sheath and the inner sheath may be parallel and concentric to one another.

End disks may be formed at the two axial ends of the lamination stack to cover the respective end faces of the lamination stack at least in certain portions. The end disks may be connected to the inner sheath and/or to the outer sheath and may be incorporated in the encapsulation by injection molding. The end disks can contribute to insulation and to reducing the noise emission. It is optionally possible to connect the inner sheath and the outer sheath to one another at one axial end or the two axial ends by means of the end disk.

The invention also relates to a method for producing a laminated core for a stator or rotor. The method comprises providing multiple laminations and stacking the laminations one on top of another in an axial direction to form a lamination stack. The method further includes assembling the laminations to form a laminated core by way of a transfer molding process or an injection molding process. The laminations are at least partially encapsulated by injection molding. The method further includes introducing a tie rod of plastic, in particular by injection molding, into a through-opening formed in the lamination stack so that the tie rod extends parallel to the axial direction through the laminations. Thus, the tie rod can be introduced into the lamination stack or the laminated core directly during the transfer molding process or injection molding process.

The method can be used to produce the laminated core that is described above. The lamination stack or the laminations may have multiple through-openings into which a respective tie rod of plastic is introduced or injection molded, as described above in relation to the laminated core. The tie rods may be widened at each end, as described above. The end portions may respectively be injection molded onto the tie rod.

Plastic may be injection molded around the lamination stack on an outer side so that the encapsulation by injection molding forms an outer sheath. Plastic may be injection molded around the lamination stack on an inner side so that the encapsulation by injection molding forms an inner sheath. End disks may be formed at the axial ends of the lamination stack, as described above.

The through-openings may be formed directly together with the laminations when the laminations are being produced, for example by punching or laser cutting. As an alternative, the through-openings may be formed when the laminations are stacked one on top of another to form a lamination stack, for example by boring.

One or more groove cores may be introduced during or after the stacking of the laminations one on top of another. The groove cores may be introduced into the grooves between the stator teeth on the inner side of the laminations to align the laminations relative to one another (alignment about the axial direction). The groove cores make it possible to align the laminations (individual sheet-metal laminations) correctly in relation to one another by bringing the grooves in line with one another by way of the groove cores extending parallel to the axial direction. The stacked and aligned laminations then can be assembled correctly.

The method may include introducing surface insulation via the groove cores that have been introduced or are to be introduced. Thus, surface insulation can be introduced into the grooves, i.e. into the regions between the stator teeth. A process step can be saved by introducing the surface insulation together with the groove cores. This optimizes the production of the laminated core.

The method may include applying a compressive force before or during assembly. The compressive force may be applied in the axial direction to the laminations that are stacked to form a lamination stack. The compressive force may act in a ring portion of the laminations or of the lamination stack that lies on the radially outer edge and/or the compressive force may act in a ring portion located on the radially inner end of the stator teeth. A compressive force may be applied to the laminations or lamination stack for example by a clamping device in the injection molding tool or transfer molding tool, preferably before encapsulating the lamination stack with the plastic material and/or before forming the tie rods. A (radially) optimized arrangement of the pressure points in the tool results in uniform compression of the laminations and in particular of the stator teeth. The compressive force may be released when the endlarged or wide ends of the tie rods, and/or the end disks and/or the inner or outer encapsulation has cured to hold the lamination stack in the compressed state.

It is possible to avoid fanning out of the laminated core on its inner side or in the region of its internal diameter. An optimum selection of the pressure points in the regions specified contributes to good dimensional stability of the laminated core.

The method for producing a laminated core may include the measures described above in connection with the laminated core.

Further advantageous configurations will emerge from the following description and the drawing.

BRIEF DESCRIPTION OF THE DRAWINGS

FIGS. 2a-d show possible configurations for the encapsulation of the laminated core of FIGS. 1a and 1b by injection molding.

DETAILED DESCRIPTION

Figure 1A:
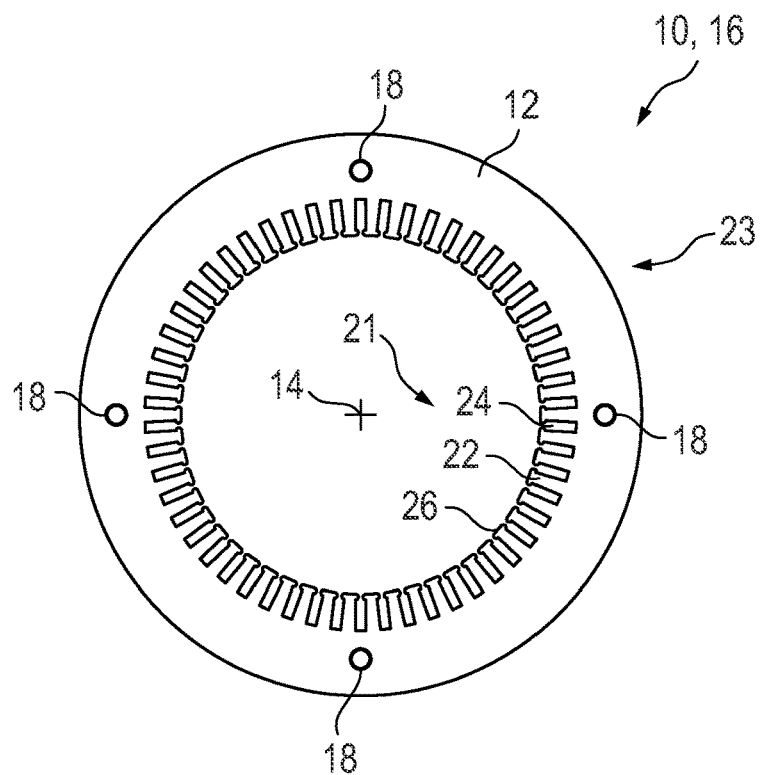
FIG. 1a is a plan view of a laminated core and FIG. 1b is a cross section taken along a plane that includes the axis of the laminated core
Figure 1B:
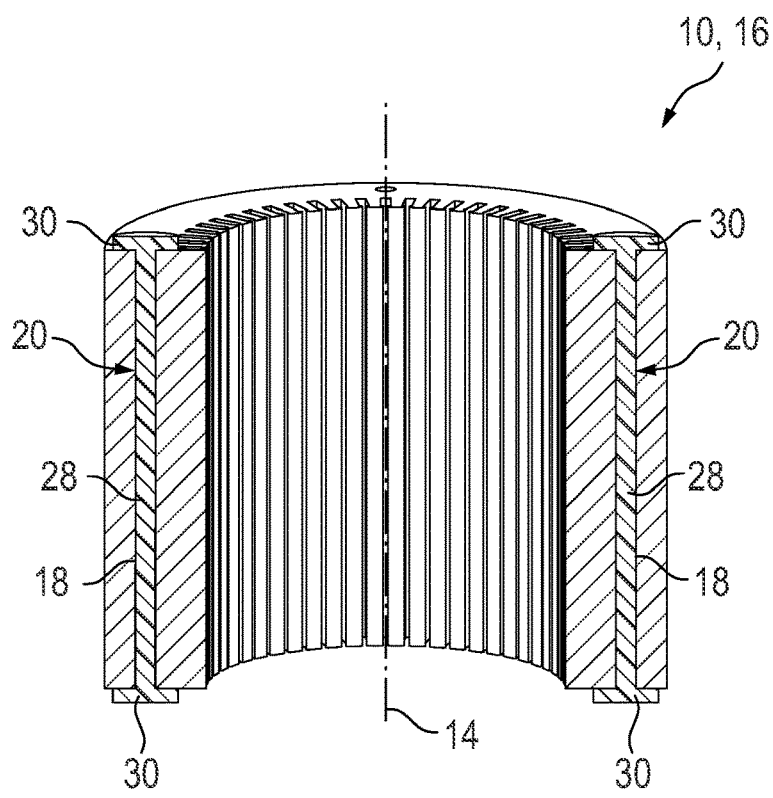

FIGS. 1a and 1b illustrate a cut-open side view of a laminated core 10. The example illustrates a laminated core 10 for a stator of an electric machine that is referred to below as "stator laminated core 10".

The stator laminated core 10 is formed from multiple laminations 12 that are stacked one on top of another in an axial direction 14 to form a lamination stack 16. In the example, four through-openings 18 are formed in the lamination stack 16 and extend parallel to the axial direction 14 through the laminations 12 or the lamination stack 16, (cf. FIG. 1a). To assemble the stator laminated core 10, a respective tie rod 20 of plastic is introduced, in particular injection molded, in the through-openings 18 (cf. FIG. 1b; for the sake of clarity, only two tie rods 20 are shown).

The through-openings 18 are distributed uniformly in the circumferential direction of the laminations 12 and are offset in relation to one another by an angle of 90°. Radially inwardly projecting stator teeth 22 are formed on the inner side 21 of the laminations 12, and grooves 24 are between the stator teeth 22. A cross-sectionally widened head 26 is formed on the radially inner end of the stator teeth 22.

Each tie rod 20 has end portions 30 at each axial end. Each end portion 30 is widened cross-sectionally with respect to the through-opening 18 or that portion 28 of the tie rod 20 that extends in the through-opening 18 (see FIG. 1b).

FIGS. 2a to 2d illustrate possible configurations for injection molding plastic around the stator laminated core 10.

FIG. 2a shows a first configuration, in which plastic is injection molded around the lamination stack 16 on the inner side 21. The encapsulation by injection molding forms an inner sheath 32. In addition, plastic is injection molded around the lamination stack 16 on an outer side 23. The encapsulation by injection molding forms an outer sheath 34.

An end disk 36 is formed at each axial end of the lamination stack 16 and covers the respective end face of the lamination stack 16 at least in certain portions. The end disks 36 are each connected to the inner sheath 32 to provide a virtually complete encapsulation by injection molding, the end disks 36. The outer sheath 34 and the inner sheath 32 are not connected to one another to prevent stress cracks during the demolding (unmolding) operation. The outer sheath 34 and the inner sheath 32 have sleeve-shaped forms and extend in the axial direction 14 (not indicated in FIG. 2 for the sake of clarity). The outer sheath 34 and the inner sheath 32 are concentric to one another.

FIG. 2b shows a configuration that largely corresponds to the configuration in FIG. 2a, but the end disks 36 are omitted (no end disks are incorporated). The outer sheath 34 and the inner sheath 32 are not connected to one another.

FIG. 2c shows a configuration that largely corresponds to the configuration in FIG. 2a, but with the outer sheath 34 being omitted. Assembly can take place via the inner sheath 32. The end disks 36 are incorporated in FIG. 2c.

FIG. 2d shows a configuration similar to FIG. 2a, but with the inner sheath 32 and the outer sheath 34 being connected by the end disks 36.

Figure 3:
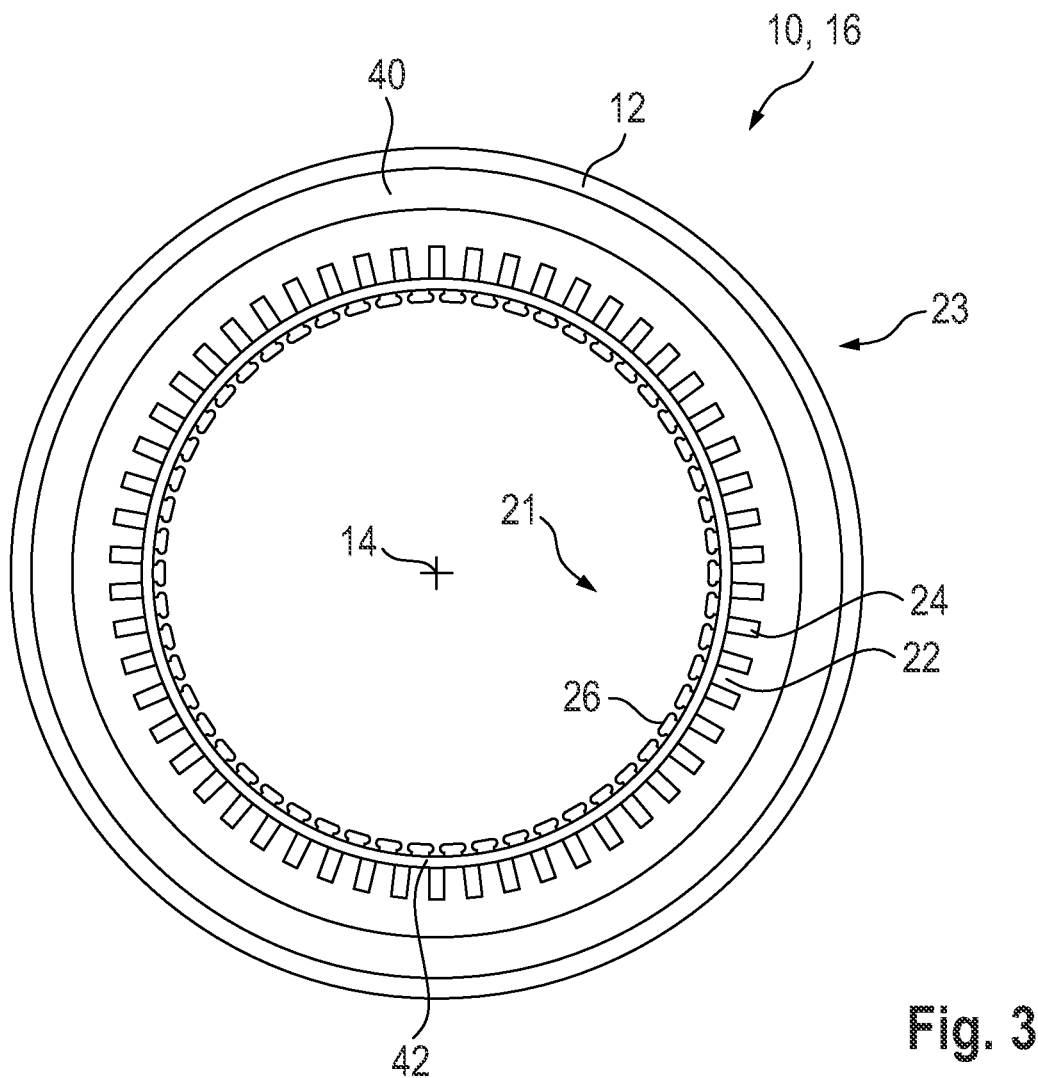
FIG. 3 is a plan view of the laminated core of FIG. 1a with marked ring portions as possible positions at which a compressive force acts.

FIG. 3 is a plan view of the stator laminated core 10 of FIG. 1a with marked ring portions 40, 42 as possible positions at which a compressive force acts. The method for producing a stator laminated core 10 may proceed as described above. Before or during the assembly, the laminations 12 that are stacked to form a lamination stack 16 may have a compressive force applied to them in the axial direction 14, for example by a corresponding clamping device, as explained above.

The compressive force may act in a ring portion 40 of the laminations 12 or of the lamination stack 16 that lies on the radially outer edge and/or in a ring portion 42 located at the radially inner end of the stator teeth 22, as explained above.

What is claimed is:

1. A laminated core (10) for a stator or rotor of an electric machine, the laminated core (10) comprising: multiple laminations (12) stacked one on top of another in an axial direction (14) to form a lamination stack (16) having opposite first and second axial end faces, through-openings (18) extending through the laminations (12) in the lamination stack (16) from the first axial end face to the second axial end face and aligned parallel to the axial direction (14); tie rods (20) of plastic injection molded respectively in the through-openings (18) to assemble the laminated core (10), opposite axial end portions (30) of the tie rods (20) being cross-sectionally widened with respect to the respective through-opening (18) and extending respectively onto the first and second axial end faces; a plastic outer sheath (34) injection molded around an outer circumferential side (23) of the lamination stack (16) and encapsulating the outer circumferential side (23) of the lamination stack (16) continuously from the first axial end face to the second axial end face; and first and second end disks (36) that respectively cover the opposite first and second axial end faces of the lamination stack (16) at least in certain portions, the first and second end disks (36) being connected to the outer sheath (34).

2. The laminated core (10) of claim 1, further comprising plastic injection molded around an inner circumferential side (21) of the lamination stack (16) to form an inner sheath (32) encapsulating the inner side (21) of the lamination stack (16).

3. The laminated core (10) of claim 2, wherein the first and second end disks (36) are connected to the inner sheath (32).

4. A laminated core (10) for a stator or rotor of an electric machine, the laminated core (10), comprising: multiple laminations (12) stacked one on top of another in an axial direction (14) to form a lamination stack (16) having opposite first and second axial end faces, through-openings (18) extending through the laminations (12) in the lamination stack (16) from the first axial end face to the second axial end face and aligned parallel to the axial direction (14); tie rods (20) of plastic injection molded respectively in the through-openings (18) to assemble the laminated core (10), opposite axial end portions (30) of the tie rods (20) being cross-sectionally widened with respect to the respective through-opening (18) and extending respectively onto the first and second axial end faces; a plastic injection molded around an inner circumferential side (21) of the lamination stack (16) to form an inner sheath (32) encapsulating the inner circumferential side (21) of the lamination stack (16) continuously from the first axial end face to the second axial end face; and first and second end disks (36) that respectively cover the opposite first and second axial end faces of the lamination stack (16) at least in certain portions, the first and second end disks (36) being connected to the inner sheath (34).

5. A method for producing a laminated core (10) for a stator or rotor of an electric machine, comprising:
providing multiple laminations (12), the laminations (12) having a ring portion (40) on an outer circumferential side of the laminations and having stator teeth (22) on an inner circumferential side of the laminations, stator grooves (24) being formed between the stator teeth (22), each of the laminations having through-openings (18) extending through the ring portion (40) of the respective laminations (12);
stacking the laminations (12) one on top of another in an axial direction (14) to form a lamination stack (16);
introducing groove cores into the stator grooves (24) between the stator teeth (22) on the inner circumferential side (21) of the laminations (12) to align the laminations (12);
applying a compressive force in the axial direction (14) to the laminations (12) that are stacked to form the lamination stack (16);
assembling the laminations (12) to form a laminated core (10) by a transfer molding process or an injection molding process that includes:
introducing a tie rod (20) of plastic into the through-openings (18) formed in the lamination stack (16) and extending parallel to the axial direction (14) through the laminations (12), and
at least partially encapsulating the lamination stack (16) by injection molding to form a plastic outer sheath (34) around an outer side (23) of the lamination stack (16) and encapsulating the outer side (23) of the lamination stack (16) continuously from a first axial end face to a second axial end face that is opposite the first axial end face.

6. The method of claim 5, further comprising inserting surface insulation via the groove cores.

7. The method of claim 5, further comprising applying a compressive force in the axial direction (14) to the laminations (12) that are stacked to form a lamination stack (16), the compressive force acting in a ring portion (40) of the laminations (12) that lies on a radially outer edge and/or in a radially inner edge of the laminations (12).

8. The method of claim 7, wherein the compressive force is applied before performing the transfer molding process or the injection molding process.

9. A laminated core (10), produced by the method of claim 5.

* * * * *